United States Patent [19]
Arai

[11] Patent Number: 6,027,220
[45] Date of Patent: Feb. 22, 2000

[54] SURFACE LIGHT SOURCE DEVICE OUTPUTTING POLARIZED FRONTAL ILLUMINATION LIGHT

[75] Inventor: Takayuki Arai, Kasukabe, Japan

[73] Assignees: Enplas Corporation, Kawaguchi; Yashuhiro Koike, Yokahama, both of Japan

[21] Appl. No.: 08/752,428

[22] Filed: Nov. 19, 1996

[51] Int. Cl.[7] .................................................. F21V 7/04
[52] U.S. Cl. .............................. 362/19; 362/31; 362/331
[58] Field of Search .................................. 362/19, 31, 26, 362/331, 339; 359/487

[56] References Cited

U.S. PATENT DOCUMENTS

| | | | |
|---|---|---|---|
| 5,361,190 | 11/1994 | Roberts et al. | 362/61 |
| 5,422,756 | 6/1995 | Weber | 359/487 |

FOREIGN PATENT DOCUMENTS

| | | |
|---|---|---|
| 7-261122 | 10/1995 | Japan . |
| 7-270792 | 10/1995 | Japan . |
| 8-160204 | 6/1996 | Japan . |
| 8-271894 | 10/1996 | Japan . |

*Primary Examiner*—Sandra O'Shea
*Assistant Examiner*—Marshall Honeyman
*Attorney, Agent, or Firm*—Staas & Halsey, LLP

[57] ABSTRACT

The invention is a surface light source device capable of effectively producing polarized illumination light. The output angle of a representative beam C3 representing P-polarized component of output light from an emission surface 5 of the light guide plate 1 is about 75°. Where P-polarization component of representative beam C3 is 100 (reference value), and the S-polarized component is 42.2. Representative beam C3 enters from an air layer AR to a flat surface 24g of a prism sheet 24, and then goes into the inside of prism sheet 24. At this stage the P-polarization component is 89.3 whereas the S-polarization component is 25.5. Beam C3 is incident on a slant surface 24d from its inside at an angle proximating the normal, and propagates into air layer AR between prism sheets 24, 34. Beam C3 impinges on a flat surface 34g of a prism sheet 34 while its corresponding part passes through the inside of prism sheet 34. At this stage its P-polarization component is 83.9 and its S-polarization component is 22.3. Beam C3 enters from the inside of one slope 34d of the prism array at the angle of incidence of 31°. Its greater part is output to external air layer AR as illumination light substantially in the front direction.

6 Claims, 12 Drawing Sheets

(1)

SURFACE LIGHT SOURCE DEVICE OUTPUTTING POLARIZED FRONTAL ILLUMINATION LIGHT

BACKGROUND

1. Field of Invention

The present invention relates to surface light source devices of the side light type employing in combination a light guide plate with emission directivity and a prism sheet, and more particularly to surface light source devices of said type improved to provide bright output illumination light having enhanced degree of polarization in the front direction. A surface light source device of the present invention is adaptable for various applications requiring uniform, polarized illumination light as well as frontal emission directivity.

2. Related Art

Surface light source devices of the side light type are provided with a light guide plate and a light source element such as cold cathode tube lamp. The light source element is disposed along one minor surface (side surface) of the light guide plate. One frontal major surface defines a light emission plane for outputting illumination light therefrom. The surface light source devices of this type have been widely employed to provide back-lighting for use in liquid crystal display due to output rays of illumination light having relatively large cross-sectional area without increasing the depth size thereof.

As one advantageous light-guide plate material, a light-scatterable optical guide is known in the art. This is an optical element which comprises a transparent optical material and a micro-component with a different refractive index being distributed therein to attain light-scattering capability. Side-light type surface light source devices using a light guide plate made of such light scatterable material are simple in structure and yet good in efficiency for light utilization. In addition, it is possible for rays of output light from the emission surface (front surface) to exhibit enhanced directivity under certain condition that the transparent optical material is well controlled in size of internal non-uniform-refractivity structure to prevent it from being excessively small (for example, 0.06 μm or less). Such light guide plate satisfying the above condition will be referred to as the one with "emission directivity" hereinafter.

Another type of light guide plate with emission directivity for use in surface light source devices of side-light type is known which has with a fine unevenness on the surface of a transparent light guide plate for suppressing occurrence of total reflection thereat. Such added surface unevenness may be attained by forming physical configuration on the surface of light guide plate per se, or alternatively by use of multiple transparent micro-particles adhered by a transparent binder on the flat surface of the light guide plate.

The use of the light guide plate with emission directivity in a side-light type surface light source devices advantageously serves to enhance the brightness when looking at the emission surface from a direction matched to the emission directivity. However, the main propagation direction (referred to as "priority propagation direction" hereinafter) of light rays as output from the emission surface of the light guide plate with emission directivity remains much deviated in angle from the front direction of the emission surface. This angle of inclination may typically range from 60° to 80°. Practical examples will be set forth later.

For instance, since observation of a liquid crystal display is ordinarily done from around the front direction, it will be desirable to provide back-lighting using illumination light that is corrected in priority propagation direction to match the front direction of the display.

One prior known approach proposed recently to achieve such correction of the priority propagation direction for coincidence with the front direction is that a certain element called the "prism sheet" is placed over the emission surface of the light guide plate used. Two modes of prism sheet layout are available: one mode is to dispose the prism sheet with its prism surface facing inwardly (opposing the emission surface), and the other is to dispose it with the prism sheet facing outwardly (opposite to the emission surface).

See FIG. 1 which is a perspective view of the basic arrangement of one prior art surface light source device employing the former mode. Referring to FIG. 1, numeral 1 designates a light guide plate having a wedge-shaped cross-section, which is comprised of a chosen light-scattering optical conductive material consisting of, for example, a matrix made of polymethylmethacrylate (PMMA) and a hetero-refractivity material with different refractive index values as uniformly distributed therein. The light guide plate 1 has a thickness-increased end edge portion for defining a light incidence surface 2 while an associated light source element (cold cathode tube lamp) L is disposed near the edge. A reflector 3 is disposed along one major surface (back surface) 6 of the light guide plate 1, which reflector is made of either a silver foil sheet with specular reflectivity or a white sheet with diffusible reflectivity.

Light as supplied from the light source L to the light guide plate 1 is output from the other, opposite major surface (emission surface) 5. A prism sheet 4 is disposed along the emission surface 5. The prism sheet 4 has a prism array having a number of parallel elongate prism units with fine pitches; it also has a flat surface 4e without such prism array. One prism element of the array is defined by a pair of slant surfaces 4a, 4b.

The prism sheet 4 exhibits transparency, and may be a chosen plastic material such as polycarbonate, for example. Note that in FIG. 1 and the other figures, both the distance between the prism sheet 4 and emission surface 5 and the pitch of any adjacent prisms of the array are exaggerated in scale for illustration. Where the surface light source device is applied to back-lighting of a liquid crystal display, a known liquid crystal display panel will be further disposed outside the prism sheet 4.

In the surface light source device shown in FIG. 1, the light guide plate 1 is constantly decreased in thickness with an increase in distance from the light incidence surface 2. Thus, the characteristics of illuminance efficiency and illuminance uniformity are superior due to the effect of repeated reflections within the light guide plate 1. Such effect based on the wedge shape of light-scatterable optical guide has been fully described in Published Unexamined Japanese Patent Application No. 7-198956.

Light fed from the light source element L into the inside of light guide plate 1 is optically guided to travel toward the opposite side edge 7 of a decreased thickness while undergoing some scattering and reflecting actions. Through this process, light will be gradually output from the emission surface 5. As has been described previously, the output light from the emission surface 5 has a priority propagation direction 5a under certain condition that particles of different refractive index distributed within light guide plate 1 is not extremely small in size (generally, the correlation distance regarding the ununiform-refractivity structure as will be described in detail later). This priority propagation direction 5a is usually inclined approximately by 60° to 80° with respect to the normal to the emission surface 5.

The output light from the emission surface 5 having the priority propagation direction 5a enters from the internal surfaces 4a, 4b of the prism sheet 4 and then leaves the external surface 4e substantially in the front direction. This correction action in priority propagation direction is mainly based on the internal reflection of the prism sheet, which will be explained with reference to FIG. 2 below.

FIG. 2 is a diagram for explanation of light's behavior within the profile along the "perpendicular direction to lamp L." Here, the "perpendicular direction to lamp L" may refer to the "direction normal to the elongate direction of lamp L"; more specifically, it means the "direction crossing at right angles to the elongate direction of the light incidence surface 2." This will be simply called the "lamp-normal direction" hereinafter. Similarly, the "parallel direction with the elongate direction of lamp L"—i.e., the "parallel direction with the elongate direction of incidence surface 2"—will be simply referred to as the "lamp-parallel direction" hereinafter.

As shown in FIG. 2, the prism sheet 4 is placed over the emission surface 5 with its prism-array surface opposing surface 5 directly. The profile of the prism array formed on the prism sheet exhibits a series of isosceles triangles with its apical angle $\phi 3$ as shown.

Under the condition that light is supplied in the direction as denoted by arrow L', the priority propagation direction of output light derived from the emission surface 5 is inclined with respect to the normal to the emission surface 5 by certain angle $\phi 2=65°$ to 75°, or therearound. Supposing that the refractive index of light guide plate 1 is approximately 1.5 (PMMA, 1.492), the angle of incidence $\phi 1$ to emission surface 5 from the inside thereof is slightly less than 40°. Such specific light rays corresponding to the priority propagation direction will be called the "representative beam" B1.

After passing straight through an air layer AR (refractive index is n0=1.0), the representative beam B1 output from the emission surface 5 is incident onto one slope 4a of the prism sheet 4 and then receives slight degree of refraction action therefrom. Attention should be paid to the fact that the rate of beam B1's incidence to the opposite slope 4b remains relatively small.

The representative beam B1 tends to pass straight through the inside of prism sheet 4 up to the slope 4b; after specular reflection (total reflection) at here, the beam hits the flat surface 4e of prism sheet 4 from its internal side. Assuming that the prism angle $\phi 3$ is suitably designed by taking account of the output angle $\phi 2$ from emission surface 5 and the refractive index n2 of prism sheet 4, the angle of incidence $\phi 4$ to flat surface 4e is about 90°, providing illumination light ray 4f which is output from the flat surface 4e of prism sheet 4 to propagate in substantially the front direction.

In this way, with use of the layout arrangement shown in FIG. 1, directional correction for forcing illumination light to collectively travel in the front direction may be accomplished. Unfortunately, however, this arrangement does not come without accompanying difficulty as follows.

As can be seen from viewing FIG. 2 also, this prior art arrangement scheme is principally designed to attain its intended conversion of the priority propagation direction mainly based on the reflecting action at the internal surface of slope 4b, providing output light 4f in the front direction. As a consequence, it remains unexpectable to attain light-collection effect which allows the output light from emission surface 5 to be derived from the surface 4e while enabling collection thereof toward the front direction. This may be reworded in such a manner that in the mode of layout letting the prism surface face inwardly, any light collecting function (condensing lens action) can hardly be expected though the polarizing function may be attained successfully.

As will be presented by use of examples later, light that is actually output from the emission surface 5 of light guide plate 1 has its propagation direction which may exhibit a spreading tendency to certain degree. Accordingly, it can be said that the prescribed layout arrangement is incapable of expecting a satisfiable light collecting function has much room for improvements with regard to outputting of light in the front direction.

In order to let the prism sheet exhibit enhanced light collecting action, another mode has been proposed to turn over the prism sheet 4 as employed in the structure of FIG. 1 in such a way that the prism surface thereof is disposed to face externally.

See FIG. 3 which is a diagram for explanation of the representative beam's behavior where such a mode of arrangement is employed. The prism sheet 4 here is disposed with its slopes (prism surfaces) 4c, 4d constituting the prism array being exposed to the outside. The profile or cross-section of each prism in the array defines an isosceles triangle. Therefore, representing the angles of inclination of these prism surfaces 4c, 4d as $\phi 6$, $\phi 7$, the following is given: $\phi 6=\phi 7$. $\phi 5$ represents the prism vertical angle.

Under the condition that light is fed as indicated by arrow L', in the same manner as in that of FIG. 2, one representative beam B2 corresponding to the priority propagation direction hits the emission surface 5 at an angle that is slightly less than $\phi 1=40°$; its greatest portion goes into an air layer AR (refractive index n0=1.0). The output angle $\phi 2$ in this case approximately ranges from 65° to 75° as has been discussed previously.

The representative beam B2 derived from the emission surface 5 goes straight within the air layer AR; thereafter, it attempts to enter at an angle the flat surface 4e of the prism sheet 4. The representative beam B2 further travels along a specific refraction path shown in FIG. 3 to outgo from the surface 4d of prism sheet 4 (part of it is from the surface 4c in some cases). By adequately designing the prism vertical angle $\phi 5$ by taking into consideration the output angle $\phi 2$ from the emission surface 5 as well as the refractive index n2 of the prism sheet 4, it is possible for the propagation direction of output light 4f to be substantially identical to the front direction.

In this way, the arrangement with the prism surface facing outwardly also can correct the priority propagation direction into the front direction. In this layout, each prism of the prism array having the paired slopes (prism surfaces) 4c, 4d may act as a convex lens or its equivalents. As a result, the front-direction collecting action may be effected even for rays of light propagating in directions angularly deviated from the representative beam B2. This means that both the polarizing function and the light collecting function can be achieved simultaneously facilitating outputting of light toward the front direction.

As mentioned above, arranging the prism sheet satisfying specific vertical angle conditions over the emission surface of the light guide plate with emission directivity with its prism array surface facing outwardly, the illumination light flux of the surface light source device is collected around the front direction thereof. However, the inventor's detailed analysis on optimal modes and arrangements of the prism sheet as employed in combination with the light guide plate with emission directivity has revealed the fact that the aforesaid scheme still suffers from several problems that remain unsolved, as follows.

(1) The optimization conditions for achievement of illumination light well collected around the front direction is not given in view of the polarization characteristics of the illumination light. The polarization characteristics of frontal illumination light is an important factor which can reflect directly on the brightness of display images when applied to back-lighting of a liquid crystal display.

(2) Concerning the profile or cross-sectional shape of the prism array of the prism sheet, the prior art approaches are made under the assumption that the profile is a series of isosceles triangles ($\phi 6 = \phi 7$), without taking care of easy processing and manufacture while avoiding degradation in characteristics.

First, an explanation will be given on the viewpoint (1) for polarization characteristics. It has been described that the vertical angle $\phi 5$ that provides the illumination light $4f$ travelling in the front direction (more precisely, the angle of inclination $\phi 6$ of the surface $4d$) is directly influenced by the output angle of refraction $\phi 2$. This in turn necessitates analyzing the intensity of output light from the emission surface 5 with respect to angles for each polarization component in order to consider the polarization characteristics of illumination light. And, the prism sheet is optimized to meet the requirements as derived from the analysis.

FIGS. 5 and 6 are graphs relating to surface light source devices (two examples) using a light guide plate with emission directivity, each of which presents the measurement result of the polarization characteristics of output light from the emission surface of light guide plate with light angle being varied. Measurement conditions used in both graphs are generally similar to that shown in FIG. 4. More specifically, the light guide plate 1 employed in the surface light source devices under measurement is constructed from light-scatterable optical guide having wedge-shaped profile. As the material of this optical guide, a matrix made of polymethylmethacrylate (PMMA with the refractive index of 1.492) was employed with silicon-based resin material (TOSPAL 120; trade name of Toshiba Silicon Co., Ltd.) being uniformly distributed therein as a material of different refractive index.

The composition ratio of silicon-based resin material was set at 0.01 weight percent (wt %) for the light guide plate used in the measurement of FIG. 5 whereas the same for that used in measurement of FIG. 6 was 0.071 wt %. Several conditions including the size of light guide plate 1 are as follows.

depth looked at from the incidence surface 2: 180 mm width: 135 mm thickness at incidence surface 2: 2.5 mm thickness at the end portion 7: 0.5 mm diameter 1 of cold cathode lamp L: 2.4 mm distance between incidence surface 2 and cold cathode lamp L: 1.0 mm The straight-tube like cold cathode lamp L is surrounded on its back side by a reflection sheet R, made of silver foil, for elimination of light dissipation. Silver foil was also disposed as a reflector 3 on a back surface 6 of light guide plate 1. Thin air layer (thickness $\delta 1$) is present between the silver foil 3 and back surface 6.

Reference character M indicates a luminance meter (Model LS110 by Minolta Co., Ltd. attached with a close-up lens of measurement view angle of $\frac{1}{3}°$) used for measurements of luminance. Under the condition that the luminance meter M is set so as to constantly view the center point P of the emission surface 5 along a view line b at a position distant therefrom by 203 mm, measurements were done while causing the direction of view line b to rotate for scanning in a vertical plane with respect to the cold cathode lamp L. The vertical axis in both graphs denotes the luminance value of cosine (COS)-corrected P- and S-polarization component. The COS-correction compensates variations in area of the emission surface under measurement in accordance with scan angles $\phi$, with $1/\cos \phi$ being as a factor.

The luminance meter M was with a polarization filter rotatably attached thereto. The polarization filter was adjusted during measurements of P-polarization component to allow such P-polarization component to pass through it at 100% while permitting no penetration of S-polarization component therethrough; during measurements of S-polarization component, on the other hand, it was adjusted permitting penetration of 100% of S-polarization component while blocking 100% of the P-polarization component. The horizontal axis of both graphs represents the direction of view line b as defined by use of the output angle $\phi$ shown in FIG. 4 (this is a generalized indication for $\phi 2$ in FIGS. 2 and 3).

From the graphs of FIGS. 5 and 6, the following can be seen.

1. The angle providing a peak of illuminance is different by several degrees depending upon the polarization component contained.

2. The P-polarization component is greater in luminance peak than S-polarization component.

These facts are not limited to the examples using the light-scatterable optical guide but may also be true for those with light guide plates with ordinary emission directivity.

Thus, in order to optimize the prism sheet 4 in an arrangement of the type shown in FIG. 3, the foregoing polarization characteristics should be taken into consideration. However, no technical idea has been proposed until today to attain such optimization of the prism sheet 4 by fully taking account of the polarization characteristics of illumination light.

A discussion will then be made as to the profile of the prism array of the prism sheet, which concerns the problem (2) above. As has been described with reference to FIG. 3, the outgoing light $4f$ toward the front direction is mainly derived from the slopes $4d$. Accordingly, insofar as the inclination angle $\phi 6$ of slopes $4d$ is set adequately, generation of output light $4f$ can be guaranteed.

On the other hand, as will be described later, the optimal value of the inclination angle $\phi 6$ for achievement of well-controlled frontal output light $4f$ remains extremely great; for example, it measures approximately 70°. Hence, under the condition that the profile of each prism in the array resembles the isosceles triangle, the resulting inclination angle $\phi 7$ of slope $4c$ must be about 70° accordingly. This results in that the angle $\phi 8$ of a groove as defined between adjacent prisms is as small as about 40°. It is difficult to precisely manufacture such grooves with the aforementioned fine shape while attaining increased yield of production, which in turn leads to an increase in manufacturing cost. If prism sheets of reduced fabrication accuracy are employed then resultant illumination light can no longer offer uniformity in distribution of intensity, rendering difficult the application to back-lighting for liquid crystal display.

SUMMARY OF THE INVENTION

It is therefore a primary object of the present invention to provide an improved surface light source device employing a combination of a light guide plate with emission directivity and one or more prism sheets and being capable of efficiently producing polarized illumination light.

It is another object of the invention to provide an improved surface light source device using easy-to-manufacture prism sheets.

The present invention proposes improvements in a surface light source device of the type which includes a light guide plate with emission directivity, means for light supply to the light guide plate from the side part thereof, and a prism sheet arrangement provided with at least one prism sheet disposed along the emission surface of the light guide plate. In accordance with the improvements, a pair of slant surfaces forming each of arrayed prism units on the prism sheet constituting a prism sheet arrangement have the angle of inclination which is chosen to satisfy certain requirements.

The requirements as to the angle of inclination are determined in such a way as to allow bright illumination light full of P-polarization component to be output substantially around the front direction, that is, the direction substantially perpendicular to the emission surface of the light guide plate. To obtain such illumination light, one or two prism sheets may be disposed. The one or two prism sheets are disposed in such a way that the prism surface of each sheet faces outwardly while its prism array is essentially parallel with the light incidence surface.

With a single prism sheet disposed, it is arranged for each prism array that the angle of inclination of one slope which is relatively far from the light supply means is chosen causing the representative beam representing P-polarization component of an output light from the emission surface of the light guide plate to enter its slope through the inside of prism sheet and then to be sent forth almost in the front direction.

On the other hand, the angle of inclination of the other slope that is relatively near the light supply means is chosen from those values falling in the range which ensures that the representative beam does not enter from the inside of such a prism sheet. Preferably, the inclination angle may be chosen to be minimum or around it in the range.

Where two prism sheets are employed, different requirements are applied with respect to a first prism sheet disposed inside and a second prism sheet disposed outside.

First prism sheet; the angle of inclination of each prism's one slope which is relatively far from the light supply means is chosen so as to cause a representative light ray representing P-polarized component of an output light from the emission surface of the light guide plate to enter the aforesaid slope of the prism sheet after penetration of the inside thereof and then to output toward the second prism sheet.

On the other hand, the inclination angle of the other slope which is relatively near the light supply means is chosen from a specific range of values which insures avoidance of incidence of the representative beam from the inside of the first prism sheet. Preferably, approximately the minimum value in the range is chosen for the inclination angle.

Second prism sheet; the inclination angle of each prism's one slope which is relatively far from the light supply means is chosen causing the representative beam representing P-polarized component of the output light from the emission surface of light guide plate to impinge on the one slope after passing through the inside of the second prism sheet and to be sent forth externally around the front direction.

The inclination angle of the remaining slope that is relatively far from the light supply means is chosen from those values falling within the range which prevents the representative beam from entering from the inside of the second prism sheet. Preferably, a specific value that approximates the minimum value within the range is determined in the same manner as in the first prism sheet.

In the illustrative embodiments employing two separate prism sheets, a moire pattern can take place as a result of such two prism sheets being laminated on each other. To avoid this, it is preferable that the pitch of prism array on the first prism sheet and that of the second prism sheet satisfy a condition that one of them is at least five times greater than the other.

In the surface light source device in accordance with the present invention, an output light from the emission surface of the light guide plate is converted by one or two prism sheets to frontal illumination light which is rich in the P-polarized light component that travels in along substantially the front direction. More specifically, the one or two prism sheets as employed in the present invention may advantageously serve to force P-polarized light component contained in the output light derived from the emission surface of the light guide plate to be guided preferentially in the front direction.

In either case of the arrangement using a single prism sheet and that using two prism sheets, the surface (effective surface) which is used mainly for outputting of intended illumination light is a specific one of each prism's paired slopes which is relatively far from a light source lamp. Accordingly, the angle condition being applied to such relatively-far slope is determined to allow the representative beam representing P-polarized light component to pass through and propagate externally in the front direction.

On the other hand, the other slope of each prism which is relatively near the light source means is an ineffectual surface that does not contribute to outputting of illumination light in the front direction. This is the reason why the inclination angle of the relatively-near slope is chosen to maximize inhibition of incidence of the representative beam from the inside of prism sheet. Especially, minimizing the range of angle values of this ineffectual surface may contribute to enhancement of productivity with manufacturing cost being reduced.

In the arrangement employing two separate prism sheets, moire string pattern will arise more frequently as the pitch of the prisms arrayed is decreased causing adjacent ones to come closer to each other in the first and second-namely, inner and outer-prism sheets piled. Accordingly, in order to eliminate a decrease in quality of illumination light due to occurrence of moire pattern (a decrease in display quality), it may be recommendable that a significant difference lies between the pitches of the former and that of the latter. Practically, it is preferable that the pitch of the prism array on the second prism sheet is at least five times greater in value than the pitch of those on the first prism sheet, or alternatively, one fifth or less than the same.

DETAILED DESCRIPTION OF THE PREFERRED EMBODIMENTS

Four embodiments I to IV will be described with reference to FIGS. 7 through 12. A single prism sheet is employed in the embodiments I and II whereas two prism sheets are used in embodiments III, IV. These embodiments correspond to the layouts such that one or more prism sheets satisfying conditions in accordance with the present invention are added to no prism sheet layout based on which the results of the graphs of FIGS. 5 and 6 are obtained.

Embodiment I

Figure 1:
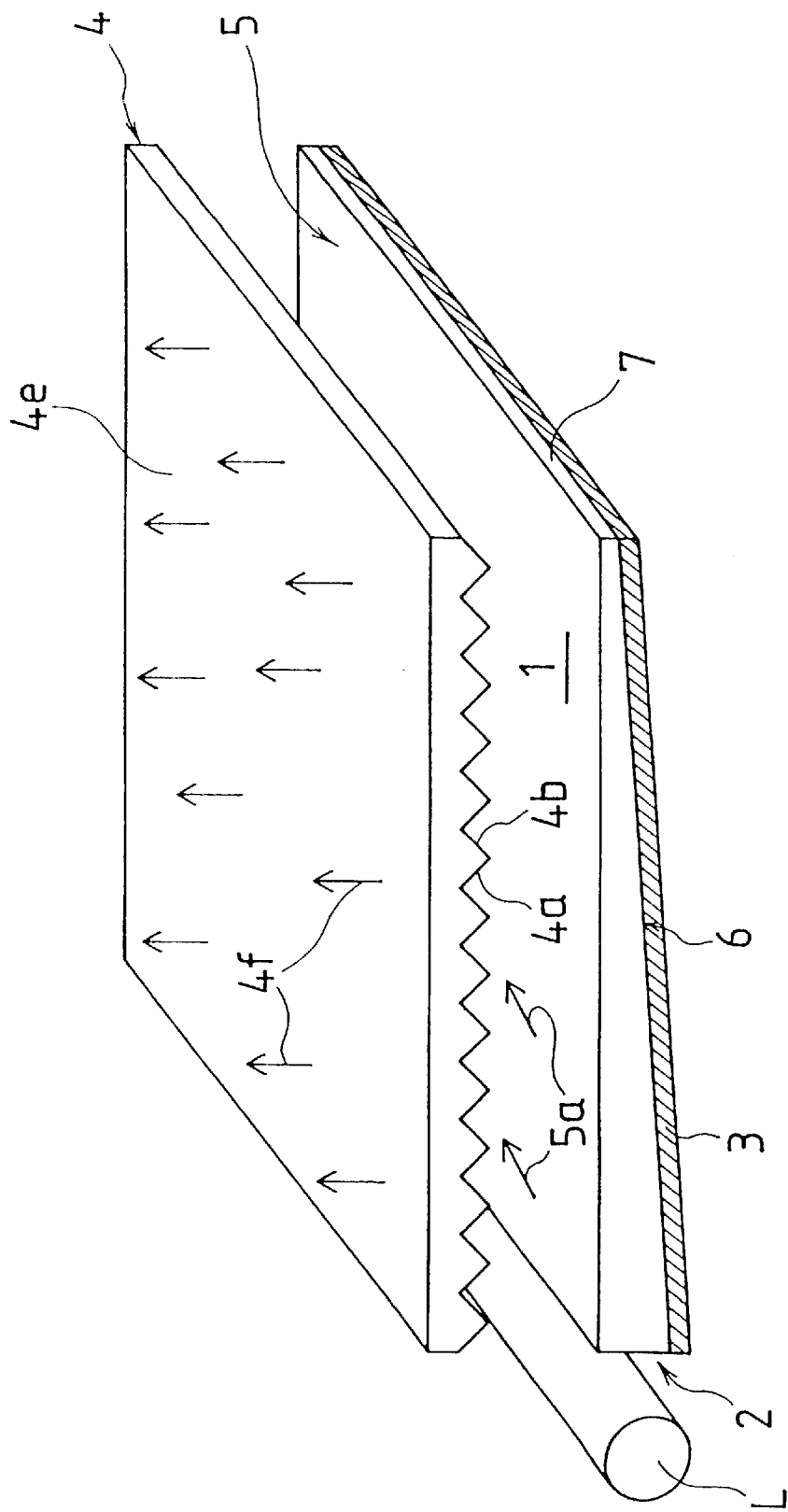
FIG. 1 is a diagram schematically showing a structure of one prior art surface light source device having a prism sheet with its prism surface being disposed inwardly.
Figure 2:
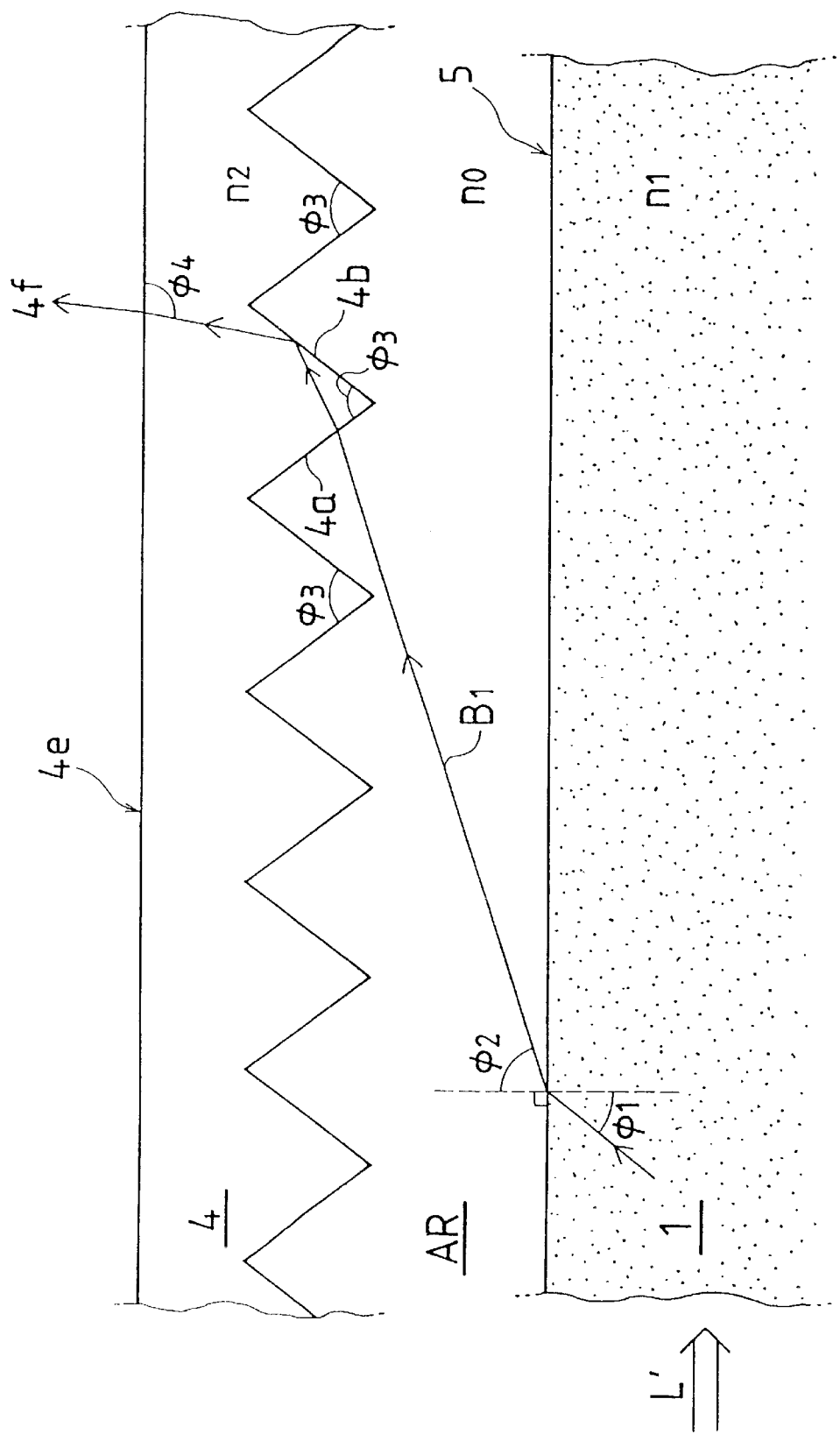
FIG. 2 is a diagram for explanation of behavior of light within a cross-section along the direction perpendicular to a cold cathode tube lamp L in the surface light source device shown in FIG. 1.
Figure 3:
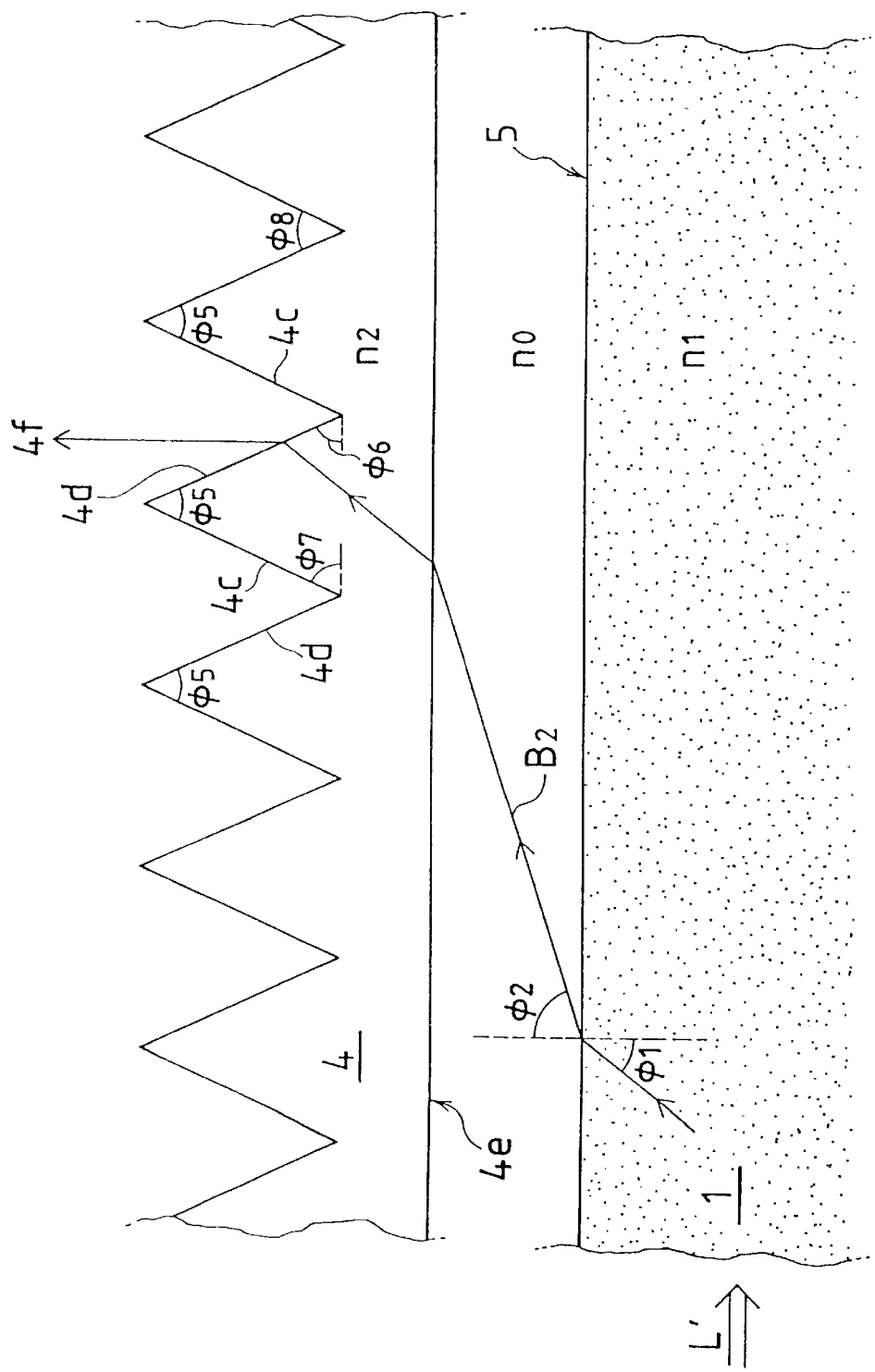
FIG. 3 is a diagram for explanation of behavior of light where the prism sheet of the surface light source device shown in FIG. 1 or 2 is turned over so that its prism surface faces outwardly.
Figure 4:
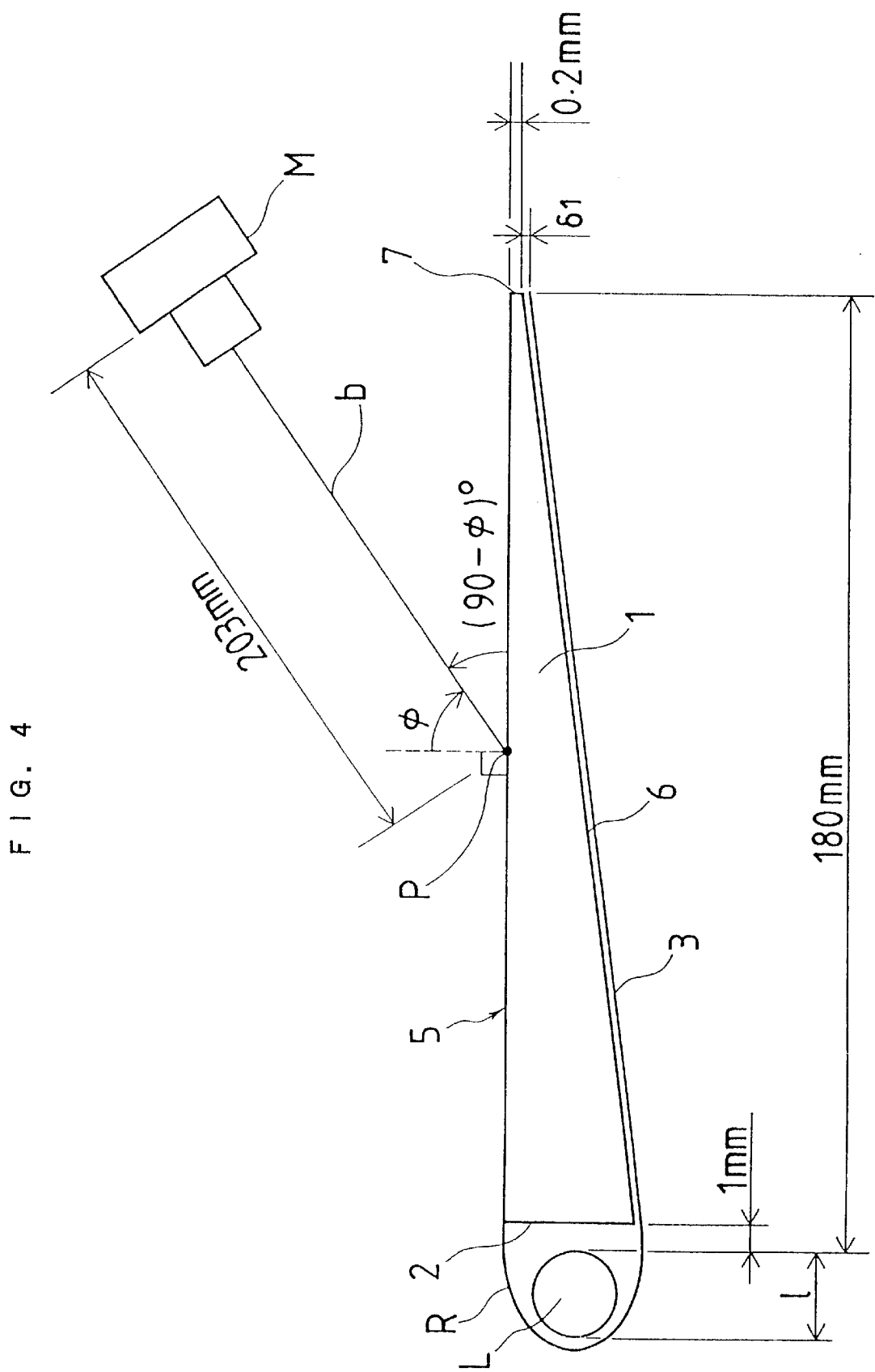
FIG. 4 is a diagram illustrating layout of measurement of the directive property for the individual polarization components of the output light from the emission surface of a light guide plate as employed in each embodiment of the present invention.
Figure 7:
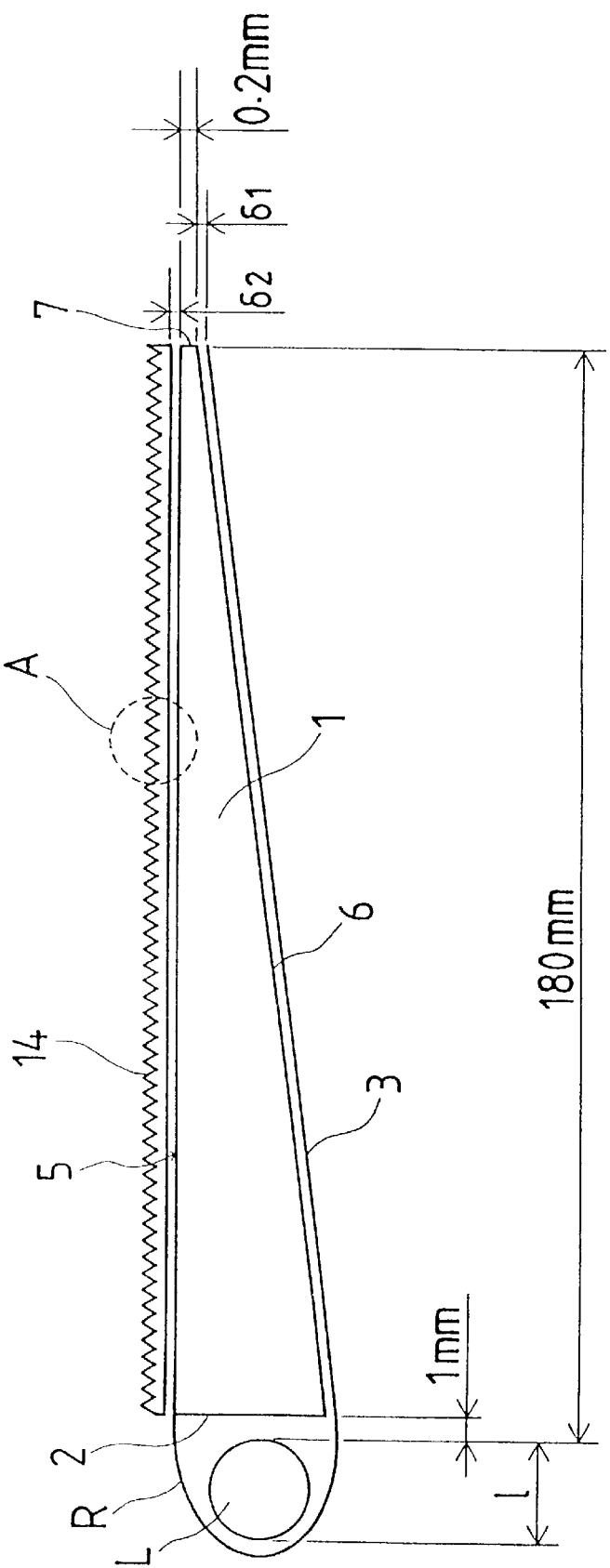
FIG. 7 is a diagram schematically showing the layout of embodiments I, II.

A layout of this embodiment is schematically shown in FIG. 7, which may correspond in structure to the surface light source device shown in FIG. 4 being added with a prism sheet 14. A light guide plate 1 having a wedge-shaped cross-section is comprised of a light-scatterable light guide. As the material of this guide, a matrix made of polymethylmethacrylate (PMMA with the refractive index of 1.492) was employed in which silicon-based resin material (TOSPAL 120, trade name of Toshiba Silicon Co., Ltd.) was uniformly distributed as a different refractive index material.

Figure 5:
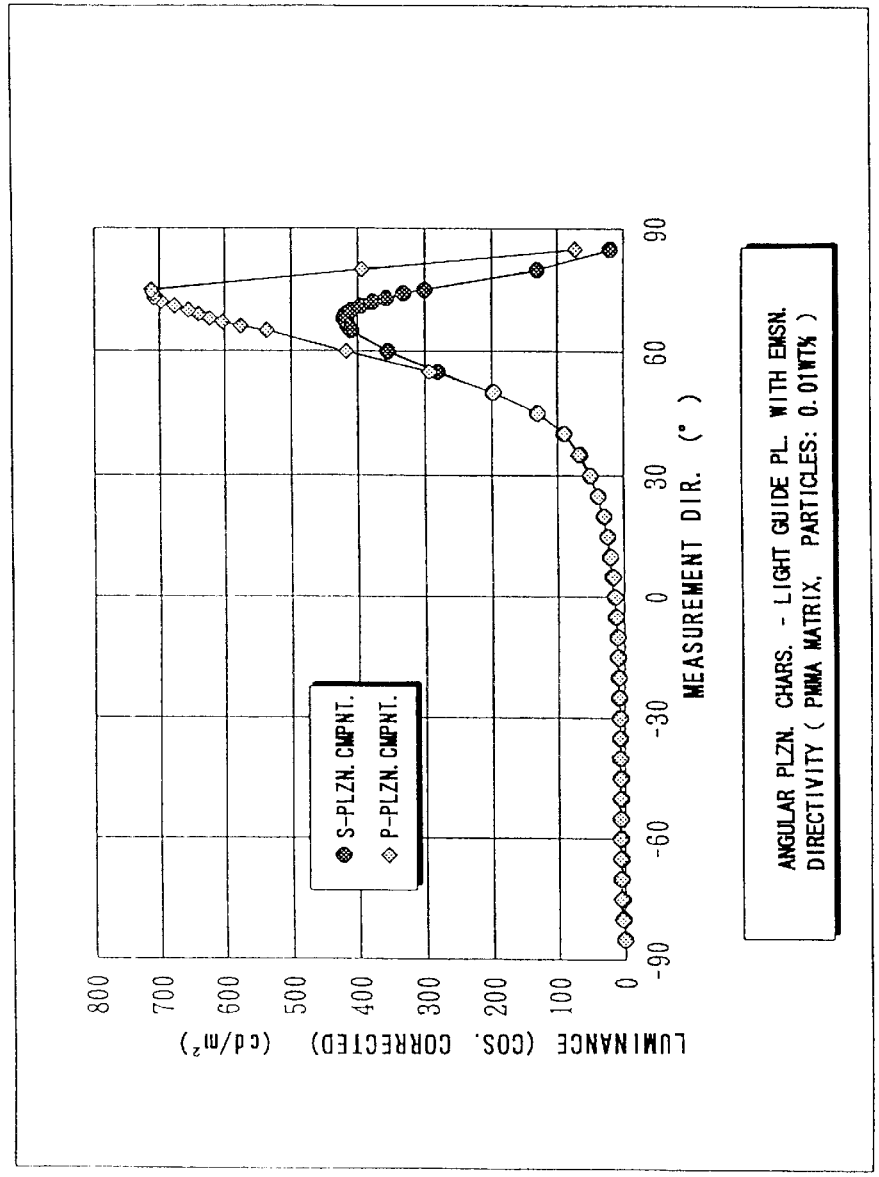
FIG. 5 is a graph demonstrating the result of a measurement conducted by use of the layout of FIG. 4.
Figure 6:
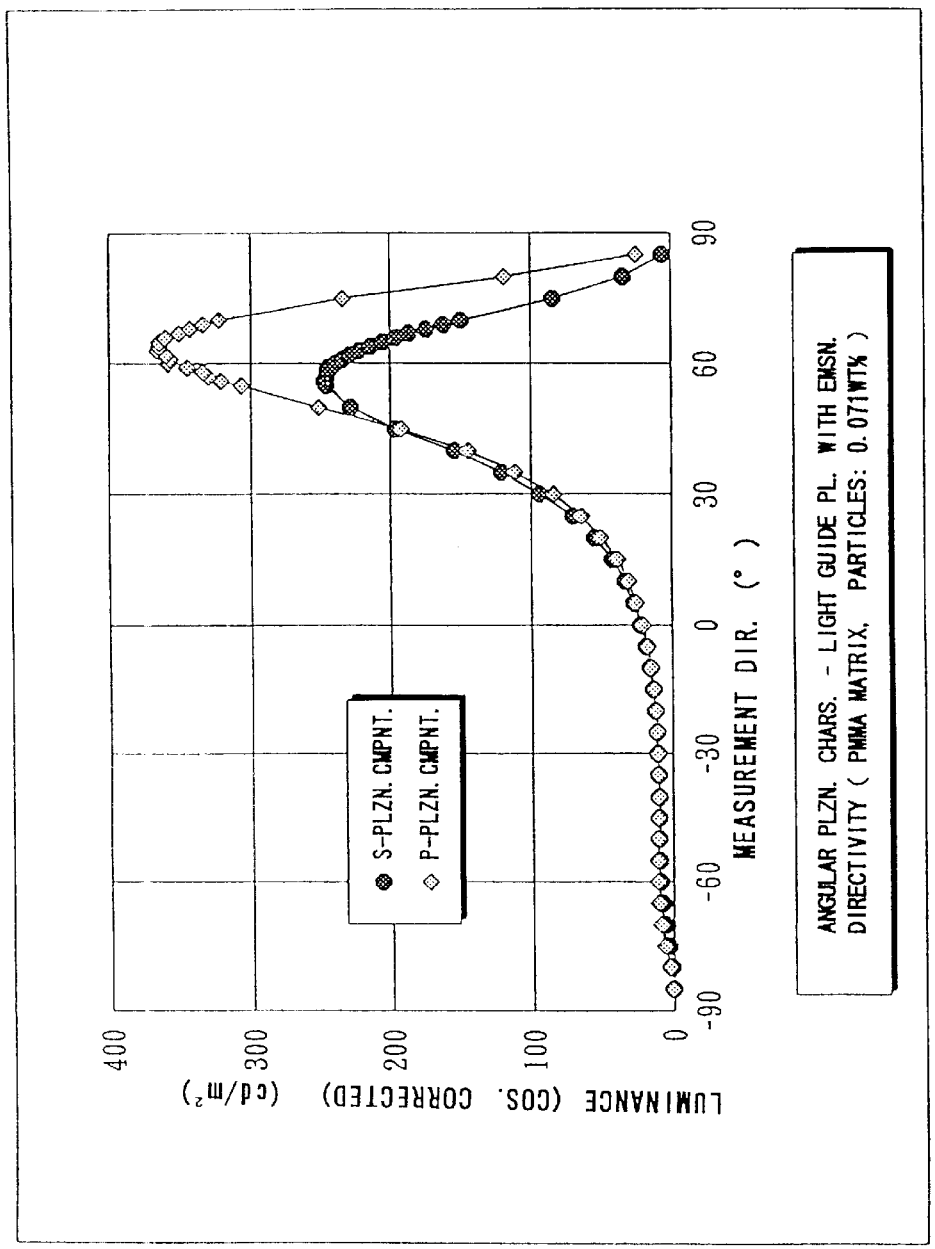
FIG. 6 is a graph showing another measurement result with the layout of FIG. 4 used.

The composition ratio of silicon-based resin material was set at 0.01 wt % in the same manner as in the light guide plate used in the measurement of FIG. 5. Several conditions including the size of light guide plate 1 are as follows.

depth looked at from the incidence surface 2: 180 mm width: 135 mm thickness at incidence surface 2: 2.5 mm thickness at the end portion 7: 0.5 mm diameter 1 of cold cathode tube lamp L: 2.4 mm distance between surface 2 and lamp L: 1.0 mm The straight-tube like cold cathode lamp L is surrounded on its back side by a reflection sheet R made of silver foil for elimination of light dissipation. Silver foil was also disposed on a back surface 6 of light guide plate 1 as a reflector 3. Thin air layers ($\delta 1$, $\delta 2$ in thickness) are defined between the silver foil 3 and back surface 6 and between emission surface 5 and prism sheet 14.

Figure 8:
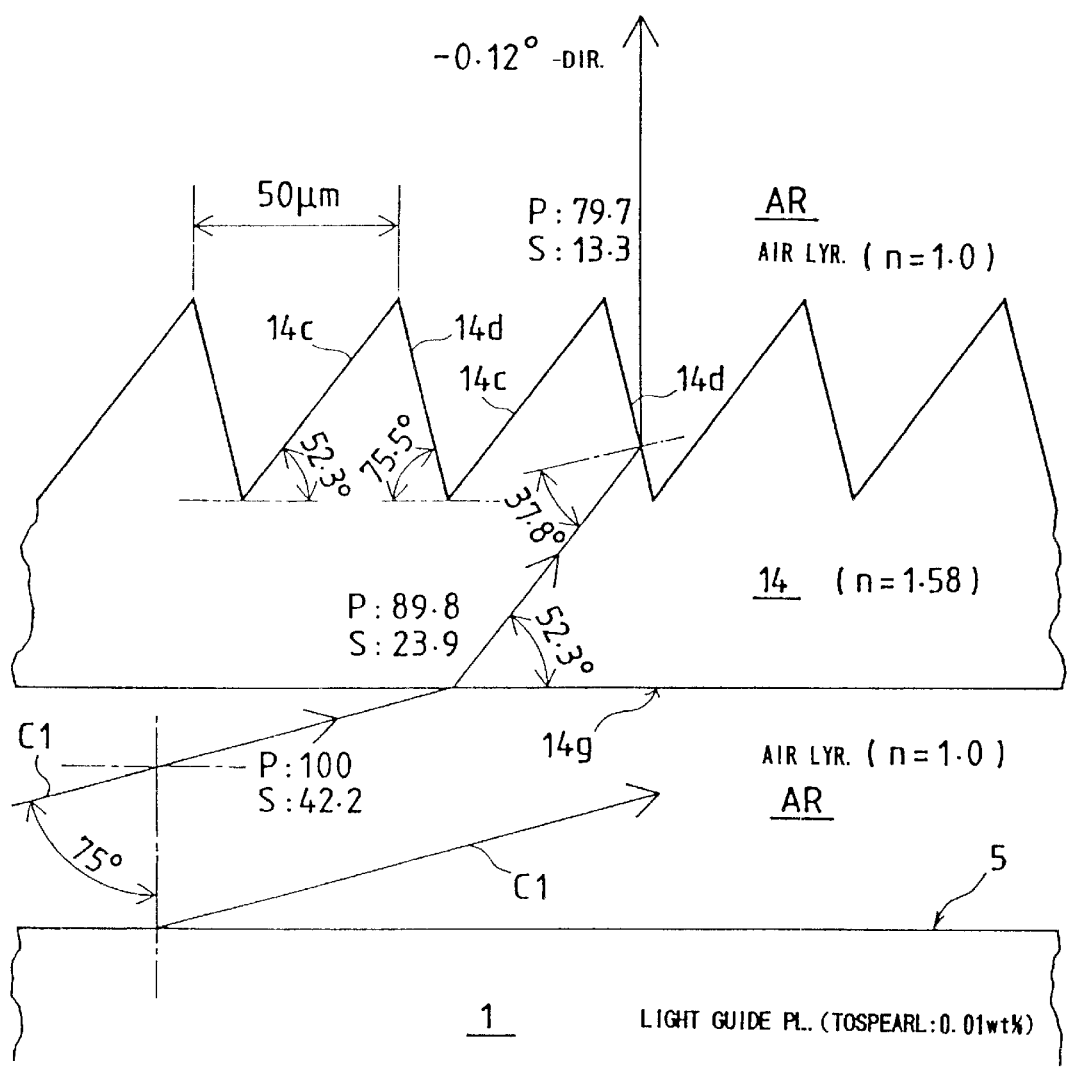
FIG. 8 is an enlarged depiction, with respect to the embodiment I, of certain peripheral sections (refer to reference character "A") of the light emission surface 5 and of a prism sheet 14 in the layout shown in FIG. 7 while accompanying the loci of beam representative of P-polarized component and the ratio of P- and S-polarized component as contained in the representative beam.

A cross-sectional structure and function of the prism sheet 14 used in this embodiment I will be explained with reference to FIG. 8 in addition. FIG. 8 enlargedly illustrates the peripheral sections (see reference character A) of the emission surface 5 and prism sheet 14 in the arrangement shown in FIG. 7, with the loci of one representative beam representing P-polarized light component and the composition ratio of P- and S-polarized component as contained in the beam.

As shown in FIG. 8, the prism sheet 14 has a prism surface on which an array of multiple prism elements each defined by slant surfaces 14c, 14d are formed with a pitch of 50 $\mu$m. The prism sheet 14 is disposed with the prism surface facing outwardly while a flat surface 14g face inwardly. In each prism of the array, the slope 14c which is relatively near the cold cathode lamp L measures 52.3° in angle of inclination, whereas the inclination angle of the slope 14d which is relatively far from the cold cathode tube L is 75.50.

The prism sheet 14 is made of polycarbonate having a reflective index of 1.58. From FIG. 5, the output angle from the emission surface 5 of light guide plate 1, which angle corresponds to the priority propagation direction of P-polarization component, is approximately 75°. One representative beam C1 representing P-polarization component with such priority propagation direction behaves as will be set forth below.

Where the P-polarization light component contained in the representative beam C1 is 100 (reference value), S-polarization component is 42.2. When representative beam C1 hits the flat surface 14g of prism sheet 14 after passing through the air layer AR, its corresponding part is refracted at flat surface 14g to the direction of an angle of 52.3° in accordance with Snell's law; then, the refracted beam propagates into the inside of prism sheet 14. At this stage the P-polarization component are 89.8 whereas S-polarization component are 23.9.

Almost all the amount of the representative beam C1 which has travelled straight within the prism sheet 14 enters one slope 14d of a corresponding prism in the array from the inside thereof at the angle of incidence of 37.8°. Its greater portion again causes refraction pursuant to Snell's law at the slope 14d so that it is sent forth into an external air layer AR as illumination light. Angular deviation of the propagation direction of this illumination light from the front direction is as small as 0.12°. The P-polarization component is 79.9, which is large enough to conserve almost 80% of the ones leaving emission surface 5, whereas the S-polarization component is decreased to 13.3. In this way, with the surface light source device of this embodiment I, it is possible to output frontal illumination light with a rich P-polarization component.

Attention should be paid to the fact that the inclination angle, 52.3°, of the slope 14c which is relatively near the cold cathode lamp L is identical to the angle (52.3°) corresponding to the propagation angle when the representative beam C1 is propagating inside the prism sheet 14. Under this condition, the representative beam C1 is prevented from entering the slope 14c from the inside thereof. Even where the inclination angle of slope 14c is slightly increased to go beyond the value of 52.3°, any incidence of representative beam C1 from its inside will no longer happen. However, increasing the inclination angle may generally render difficult the manufacture of prism sheets; accordingly, it will be preferable to use the value of inclination angle as suggested in this embodiment.

Embodiment II

This embodiment is similar in structure to the embodiment I with the light-scattering optical guide constituting the light guide plate 1 with a change in material. With such material change, slight modification is added to the conditions as to the inclination angle of each slope of the prism array on prism sheet 14. In this embodiment, the composition ratio of silicon-based resin material (TOSPAL 120, trade name of Toshiba Silicon Co,. Ltd.) distributed in the matrix made of polymethylmethacrylate (PMMA with the refractive index of 1.492) was 0.071 wt %, which is the same as that of the light guide plate used in the measurement of FIG. 6.

Figure 9:
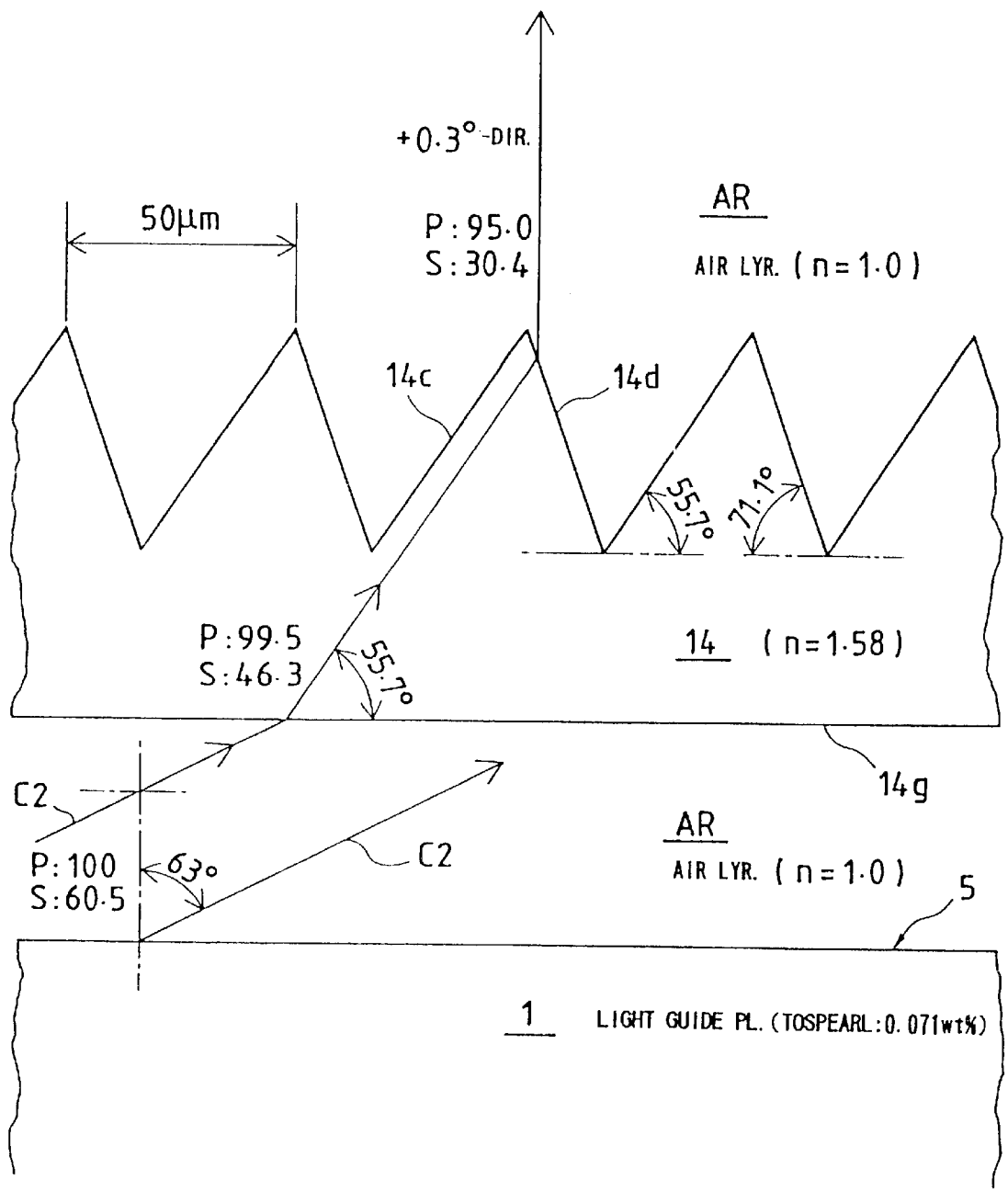
FIG. 9 is an enlarged illustration, for the embodiment II, of the peripheral sections (refer to reference character "A") of the emission surface 5 and prism sheet 14 in the layout shown in FIG. 7 while accompanying both the loci of beam representing P-polarized component and the ratio of P- and S-polarized component contained in the beam.

As shown in FIG. 9, the prism sheet 14 is with a prism surface on which an array of multiple prisms each being formed by slopes 14c, 14d are formed with 50 $\mu$m pitch. The prism sheet 14 is disposed with its prism surface facing outwardly and the flat surface 14g facing inwardly.

In each prism of the array, the slope 14c which is relatively near the cold cathode lamp L measures 55.7° in inclination angle whereas that of the slope 14d relatively far from lamp L is 71.1°.

The prism sheet 14 is made of polycarbonate that is the same as that in the embodiment I; the refractive index thereof is 1.58. According to the graph of FIG. 6, the output angle of an output light from the emission surface 5 of light guide plate 1, which angle corresponds to the priority propagation direction of P-polarization component, is about 63°. Considering one representative beam C2 in the same way as in the previous embodiment I, behavior of this beam C2 is as follows.

Assuming that the P-polarization component contained in the representative beam C2 are 100 (reference value), S-polarization component is 60.5. When the beam C2 impinges on the flat surface 14g of prism sheet 14 after passing through the air layer AR, its corresponding part is refracted at flat surface 14g toward the direction of an angle of 55.7° in accordance with Snell's law; then, the beam propagates into the inside of prism sheet 14. At this stage the P-polarization component is 99.5 whereas the S-polarization component is 46.3.

Almost the entire amount of the representative beam C2 which has travelled straight within the prism sheet 14 enters one slope 14d of a prism in the array from the inside thereof; its greater part again causes refraction pursuant to Snell's law at the slope 14d so that the refracted light is sent forth to an external air layer AR as illumination light. Deviation of the propagation direction of this illumination light from the front direction is as small as 0.3°. The P-polarization component is 95.0 which is very large enough to retain almost an entire dose at the time when derived from emission surface 5. In contrast, the S-polarization component is decreased to 30.4. In this way, with the surface light source device of this embodiment II also, it is possible to output frontal illumination rich in P-polarization component.

The reason why the inclination angle of slope 14c positioned relatively near the cold cathode lamp L was set at 55.7° is the same as in the embodiment I. More specifically, the inclination angle of slope 14c is minimized while suppressing incidence of representative beam C2 onto slope 14c from its inside, enabling facilitation of manufacture of the prism sheets.

Embodiment III

Figure 10:
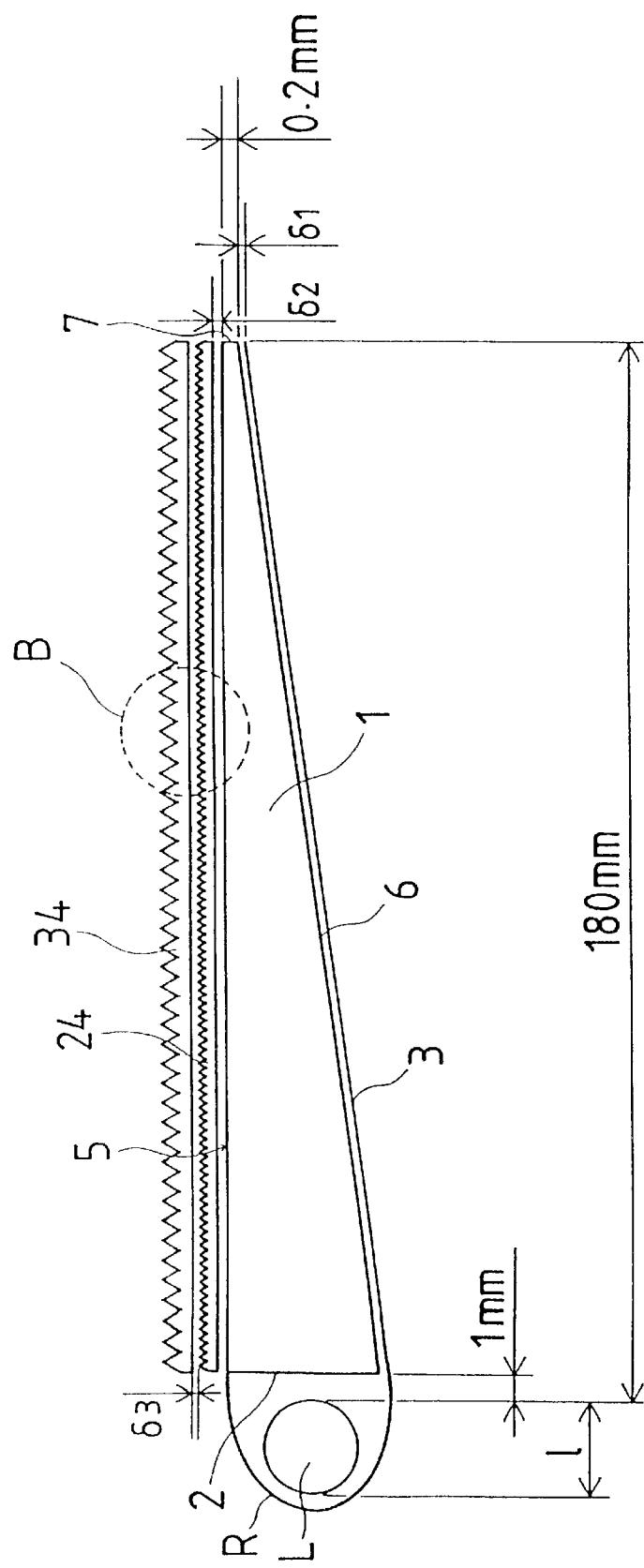
FIG. 10 is a diagram schematically showing a layout of embodiments III, IV.

A layout arrangement of this embodiment is shown in FIG. 10, which is similar in structure to the surface light source device shown in FIG. 4 with two prism sheets 24, 34 being added thereto.

The light guide plate 1 having a wedge-shaped profile is comprised of light-scattering optical guide. As the material of this guide, a matrix made of polymethylmethacrylate (PMMA with the refractive index of 1.492) was employed in which silicon-based resin material (TOSPAL 120, trade name of Toshiba Silicon Co., Ltd.) was uniformly distributed as a different refractive index material.

The composition ratio of the silicon-based resin material was set at 0.01 wt % in the same manner as in the light guide plate used in the measurement of FIG. 5. Several conditions including the size of light guide plate 1 are as follows.

depth looked at from the incidence surface 2: 180 mm width: 135 mm thickness at incidence surface 2: 2.5 mm thickness at end portion 7: 0.5 mm diameter 1 of cold cathode lamp L: 2.4 mm distance between surface 2 and lamp L: 1.0 mm The straight-tube like cold cathode lamp L is surrounded on its back side by a reflection sheet R comprised of silver foil for elimination of light dissipation. Silver foil was also disposed as a reflector 3 on the back surface 6 of light guide plate 1. Thin air layers ($\delta 1$, $\delta 2$, $\delta 3$ in thickness) are defined between the silver foil 3 and back surface 6, between emission surface 5 and prism sheet 14, and between prism sheet 24 and prism sheet 34, respectively.

Figure 11:
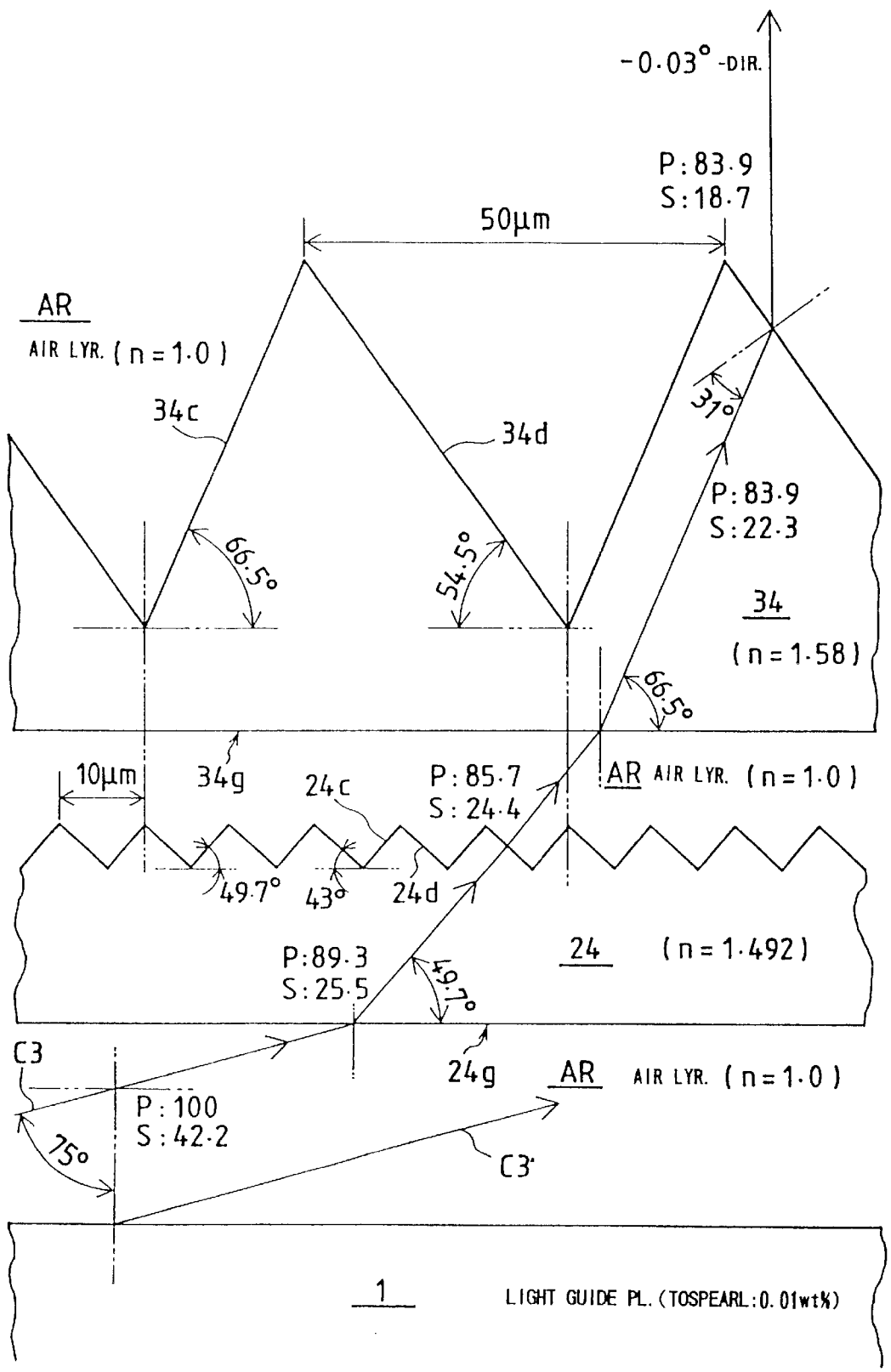
FIG. 11 is a diagram enlargedly depicting, for the embodiment III, certain peripheral sections (refer to reference character "B") of a light emission surface 5 and of prism sheet 14 in the layout shown in FIG. 10 with the loci of beam representative of P-polarization component and the ratio of P- and S-polarization component as contained in the beam.

A cross-sectional structure and function of the prism sheets 24, 34 used in this embodiment III will be explained with reference to FIG. 11 in addition. FIG. 11 enlargedly illustrates the periphery (see reference character B) of the emission surface 5 and prism sheets 24, 34 in the layout shown in FIG. 10, with the loci of one representative beam representing P-polarization component and the composition ratio of P- and S-polarization component as contained in the beam.

As shown in FIG. 11, the inner prism sheet 24 has a prism surface on which an array of a number of prism units each defined by slopes 24c, 24d are formed with 10-$\mu$m pitch. The prism sheet 24 is disposed with the prism surface faces outwardly while its flat surface 24g facing inward. In each prism the slope 24c which is relatively near the cold cathode lamp L measures 47.7° in angle of inclination whereas the inclination angle of the slope 24d relatively far from lamp L is 43°. The prism sheet 24 is made of polycarbonate (PMMA) having a reflectivity of 1.492.

On the other hand, the outer prism sheet 34 has a prism surface on which a prism array consisting of multiple prisms each defined by slopes 34c, 34d is formed with a pitch of 50 $\mu$m, which is five times greater than that of the prism sheet 24. As in the prism sheet 24, the prism sheet 34 is disposed with the prism surface facing outwardly and its flat surface 34g facing inwardly. In each prism the slope 34c that is relatively near the cold cathode lamp L measures 66.5° in angle of inclination whereas the inclination angle of the slope 34d relatively far from lamp L is 54.5°. The prism sheet 24 is made of polycarbonate with the reflective index of 1.58.

As has been mentioned previously, the output angle from the emission surface 5, which angle corresponds to the priority propagation direction of P-polarization component, is approximately 75°. As in the embodiments I, II, one representative beam C3 representing P-polarization component behaves as follows.

Representing the P-polarization component contained in the representative beam C3 by 100 (reference value), S-polarization component is 42.2. When representative beam C3 impinges on the flat surface 24g of prism sheet 24 after passing through air layer AR, its greater portion is refracted at the flat surface 24g to the direction of an angle of 49.70 as taught by Snell's law to propagate into the inside of prism sheet 24. Note that since the prism sheet employed herein is not the same in refractivity as that of the embodiment I, resultant refraction angle becomes different accordingly.

At this stage the P-polarization component is 89.3 whereas the S-polarization ones are 25.5. Almost entire dose of the representative beam C3 which has passed straight through prism sheet 24 is incident onto one slope 24d of a prism from the inside thereof at certain angle that proximates the vertical. Its corresponding part again causes refraction pursuant to Snell's law at the slope 24d so that the refracted light is sent forth to an air layer AR defined between the two prism sheets 24, 34.

Unlike the embodiments I, II, at this stage of penetration through the first prism sheet 24, the propagation angle is deviated significantly from the front direction. P-polarization component here is 85.7 which is excellently maintained, whereas S-polarization component is down to 24.4.

The representative beam C3 further progress from the air layer AR to enter a flat surface 34g of prism sheet 34; then, its corresponding portion causes refraction toward the direction of 66.5° in accordance with Snell's law so that the refracted light propagates into the inside of prism sheet 34.

At this stage the P-polarization component becomes 83.9 whereas the S-polarization component is 22.3. Almost the entirety of the representative beam C3 which has passed straight through prism sheet 34 hits one slope 34d of a prism from its inside at the angle of incidence of 31°. Its greater portion again causes refraction pursuant to Snell's law at slope 34d so that resultant light is sent forth to the external air layer AR as illumination light. Deviation of the propagation direction of this illumination light from the front direction is as small as 0.03°. The P-polarization component is as much as 83.9 which is large enough to retain almost 80% of the components leaving emission surface 5. Whereas, the S-polarization component is much decreased to 18.7. In this way, with the surface light source device of this embodiment III, output illumination light rich in P-polarization component is emitted in the front direction.

The meaning of arranging respective prism sheets 24, 34 such that the slopes 24c, 34c relatively near the cold cathode lamp L measure 49.7° and 66.5° in inclination angle respectively is the same as that of the embodiments I, II. Specifically, the inclination angle of each slope 24c, 34c is minimized in value while preventing the representative beam C3 from entering slope 24c, 34c from the inside of its corresponding prism sheet 24, 34, thereby facilitating easy manufacture of such prism sheets.

Embodiment IV

This embodiment is similar in structure to the embodiment III with the light-scatterable optical guide constituting the light guide plate 1 with a change in material. With such a material change, slight modification is added to the conditions concerning the inclination angle of each slope of the prism arrays on prism sheets 24, 34.

In this embodiment the composition ratio of silicon-based resin material (TOSPAL 120, trade name of Toshiba Silicon Co., Ltd.) distributed in the matrix made of polymethylmethacrylate (PMMA with the refractive index of 1.492) was set at 0.07 wt % as in the light guide plate used in the measurement of FIG. 6.

Figure 12:
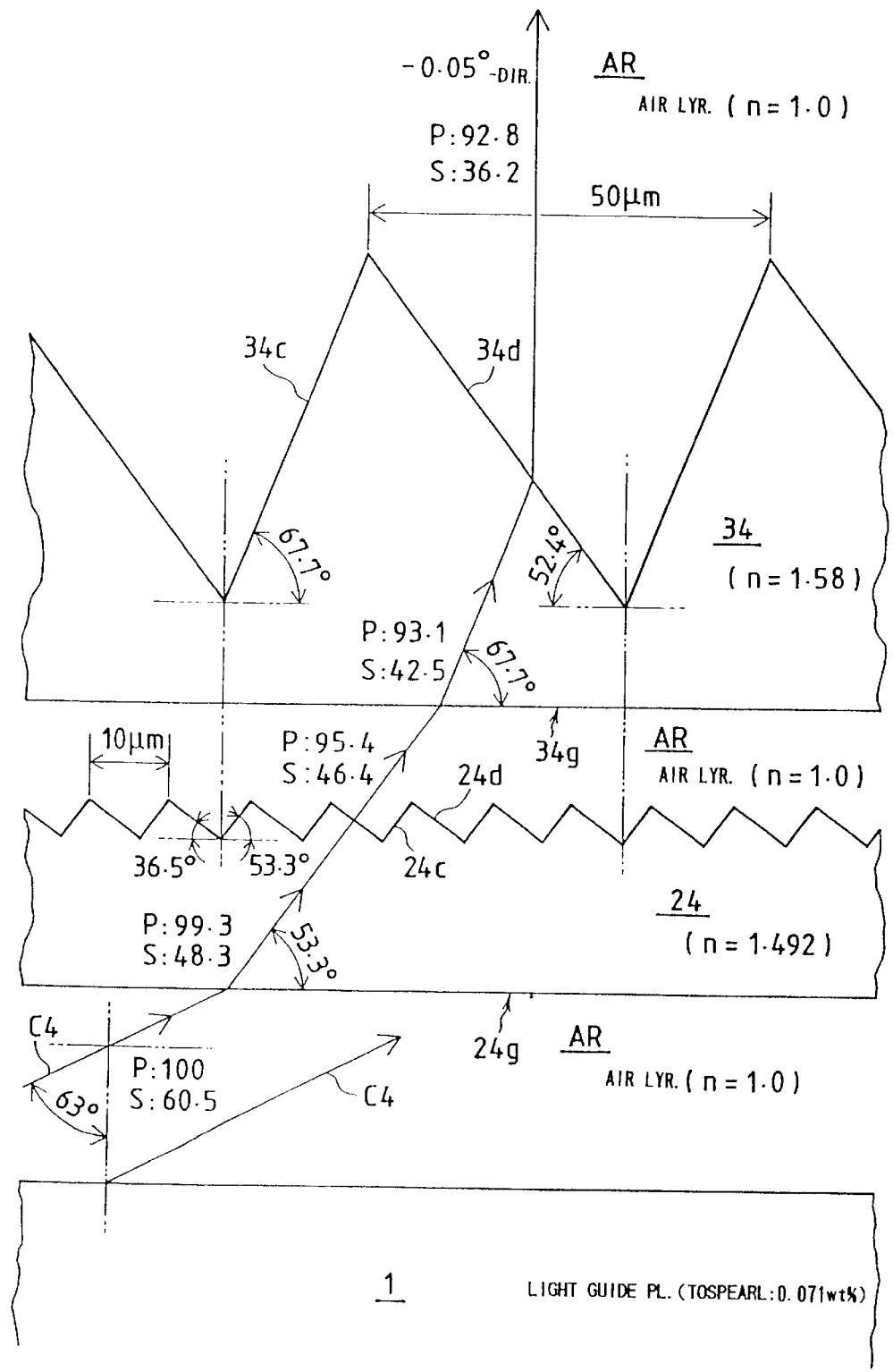
FIG. 12 is an enlarged depiction, for the embodiment IV, of the peripheral sections (refer to reference character "B") of the emission surface 5 and prism sheet 14 in the layout shown in FIG. 10 with the loci of beam representing P-polarization component and the ratio of P- and S-polarization component contained therein.

As shown in FIG. 12, the inner prism sheet 24 has a prism surface on which an array of multiple prisms each being formed by slopes 24c, 24d are formed with 10 μm pitch. The prism sheet 24 is disposed causing its prism surface to face outwardly and flat surface 24g to face inwardly. At each prism the slope 24c located relatively near the cold cathode lamp L is 53.3° in inclination angle whereas the same of slope 24d relatively far from lamp L is 36.5°. Prism sheet 24 is made of polymethylmethacrylate (PMMA) with a refractive index of 1.492.

Regarding the outer prism sheet 34, an array of multiple prisms each formed by slopes 34c, 34d is provided thereon in such a manner that the pitch of prism array is 50 μm, which is five times greater than that of the prism array on the inner prism sheet 24. Outer prism sheet 34 was disposed with its prism surface facing externally and flat surface 34g face internally as in inner prism sheet 24.

For each prism, the slope 34c relatively near the cold cathode lamp L is 67.7° in angle of inclination; that of slope 34d relatively far from lamp L is 52.4°. The prism sheet 34 is made of polycarbonate with a refractive index of 1.58.

As has been discussed previously, the output angle from the emission surface 5 of light guide plate 1, which corresponds to the priority propagation direction of P-polarization component, is about 63°. Like the embodiments I to III, one representative beam C4 representing P-polarization component behaves as will be described below.

Representing P-polarized component in the representative beam C4 by 100 (reference value), S-polarization component is 60.5. When representative beam C4 hits the flat surface 24g of prism sheet 24 after passing through air layer AR, its greater part is refracted at the flat surface 24g at an angle of 53.3° as taught by Snell's law to propagate into the inside of prism sheet 24.

At this stage the P-polarization component is 99.3 whereas the S-polarization component is 48.3. Almost all of representative beam C4 which has travelled straight within prism sheet 24 are incident onto one slope 24d of a prism from its inside at certain angle that proximates the vertical. Its greater part again causes refraction pursuant to Snell's law at slope 24d, whereby the refracted light goes into air layer AR between prism sheets 24, 34.

Like the embodiment III, at this stage of penetration through the first prism sheet 24, the propagation angle deviates significantly from the front direction. Here, the P-polarization component is 95.4 which is excellently maintained, whereas S-polarization ones drop down at 46.4.

The representative beam C4 further progresses from the air layer AR to flat surface 34g of prism sheet 34; then, its greater portion causes refraction toward the direction of 67.7° in accordance with Snell's law so that it comes into the inside of prism sheet 34.

At this stage the P-polarization component becomes 93.1 whereas S-polarization ones is 42.5. Almost all of the representative beam C4 which has passed straight through prism sheet 34 hits one slope 34d of a prism from its inside; its greater part again causes refraction pursuant to Snell's law at slope 34d so that resultant illumination light is sent forth to external air layer AR. Deviation of the propagation direction of this illumination light from the front direction is as small as 0.05°. The P-polarization component is 92.8 which is large sufficient to retain almost 90% or more of the ones leaving emission surface 5. In contrast, the S-polarization component is much decreased at 36.2. In this way, with the surface light source device of this embodiment IV also, it is possible to output frontal illumination light rich in P-polarization component. The meaning of arranging each prism sheet 24, 34 so that the slopes 24c, 34c relatively near the cold cathode lamp L is 53.3° and 67.7° in inclination angle respectively is the same as that of the embodiments I–III. Namely, the inclination angle of each slope 24c, 34c is minimized while preventing the representative beam C3 from being incident upon slope 24c, 34c from the inside of its corresponding prism sheet 24, 34, thereby facilitating easy manufacture of prism sheets.

In the foregoing embodiments III and IV, the outer prism sheet is greater (here, five times) than the inner one in pitch of prism array. Alternatively, it may be arranged so that the mutual relation of pitch values is interchanged therebetween with the remaining conditions unchanged, providing modified embodiments V, VI. Obviously, a moire fringe pattern does not arise regardless of which one of the pitch values for the inner and outer prism sheets is relatively greater than the other of them.

Although the present invention has been described in connection with several illustrative embodiments employing light-scattering optical guides for the light guide plate with emission directivity, the same principles lie in common in these embodiments in regard to how to determine the inclination angle of each prism sheet 14, 24, 34 used therein. And, in light of the foregoing description, it will be apparent to those skilled in the art that this inventive concept is applicable also to other cases, including the use of a light guide plate with no light-scattering optical guide, the use of prism sheets of different materials, and the like.

According to the present invention, a surface light source device is provided which is capable of effectively producing polarized illumination light. In addition, it is possible to provide the surface light source device with the improvements while permitting use of easy-to-manufacture prism sheets therein. These advantages will become more significant in importance where the surface light source device of the present invention is applied to back-lighting arrangement for liquid crystal display.

What is claimed is:

1. A surface light source device to output a polarized frontal illumination light, comprising a light guide plate with emission directivity, light supply means disposed along a side edge surface of said light guide plate, and a prism sheet arrangement having at least one prism sheet disposed over a light emission surface of said light guide plate, wherein said at least one prism sheet has a prism surface with an array of multiple prisms substantially parallel with said side edge surface while causing said prism surface to face outwardly, each prism at said prism sheet is defined by a pair of slant surfaces one of which is relatively far from said light supply means with an angle of inclination allowing a representative beam representing a P-polarized component of an output light from said light emission surface of said light guide plate to exit from said prism sheet arrangement in a front direction of said surface light source device, and the pair of slant surfaces forming each said prism includes a remaining slant surface relatively near said light supply means with an angle of inclination inhibiting incidence of said representative beam from inside of said prism sheet.

2. A surface light source device to output a polarized frontal illumination light, comprising a light guide plate with emission directivity, light supply means disposed along a side edge surface of said light guide plate, and a prism sheet arrangement having a single prism sheet as placed over a light emission surface of said light guide plate, wherein said single prism sheet has an array of multiple prisms substantially parallel with said side edge surface while letting a prism surface face outwardly, each said prism is defined by a pair of slant surfaces including one slant surface relatively far from said light supply means with an angle of inclination allowing a representative beam representing P-polarized component of an output light from said light emission surface of said light guide plate to exit said prism sheet arrangement in a front direction of said surface light source device, and said pair of slant surfaces forming each said prism includes a remaining slant surface relatively near said light supply means with an angle of inclination inhibiting incidence of said representative beam from inside of said prism sheet.

3. A surface light source device as set forth in claim 2, wherein the angle of inclination of said one slant surface relatively near said light supply means is minimized while inhibiting incidence of said representative beam from the inside of said prism sheet.

4. A surface light source device to output a polarized frontal illumination light, comprising a light guide plate with emission directivity, light supply means disposed along a side edge surface of said light guide plate, and a prism sheet arrangement having a first prism sheet disposed along a light emission surface of said light guide plate and a second prism sheet externally placed over said first prism sheet, wherein each of the first and second prism sheets has an array of multiple prisms substantially parallel with said side edge surface while causing its prism surface to face outwardly, each said prism of said first prism sheet is defined by a pair of slant surfaces including one slant surface relatively far from said light supply means with an angle of inclination allowing a beam representing a P-polarized component of an output light from the light emission surface of said light guide plate to enter from inside of said first prism sheet and to exit toward said second prism sheet, said pair of slant surfaces forming each said prism of said first prism sheet includes a remaining slant surface relatively near said light supply means with an angle of inclination inhibiting incidence of said representative beam from inside of said first prism sheet, each said prism of said second prism sheet is defined by a pair of slant surfaces including one slant surface relatively far from said light supply means with an angle of inclination allowing the representative beam representing the P-polarized component of the output light from the emission surface of said light guide plate to enter from inside of said second prism sheet and to exit in a front direction, and the pair of slant surfaces forming each said prism of said second prism sheet includes a remaining slant surface relatively near said light supply means with an angle of inclination inhibiting incidence of said representative beam from inside of said second prism sheet.

5. A surface light source device as set forth in claim 4, wherein the angles of inclination of said slant surfaces relatively near said light supply means in the pair of slant surfaces forming each prism array of said first prism sheet and of said second prism sheet are minimized while inhibiting incidence of said representative beam from the inside of said first or second prism sheets.

6. The surface light source device as set forth in claim 5, wherein one of said first prism sheet and said second prism sheet has a prism array with a pitch at least five times greater than that of the other prism sheet.

* * * * *